United States Patent [19]

Eckhardt et al.

[11] Patent Number: 4,623,287
[45] Date of Patent: Nov. 18, 1986

[54] DRILLING MACHINE ESPECIALLY FOR DRILLING GLASS

[75] Inventors: Rüdolf Eckhardt; Hans-Christoph Neuendorf, both of Wesel; Horst Freilingsdorf, Remscheid-Lennep, all of Fed. Rep. of Germany

[73] Assignee: Flachglas Aktiengesellschaft, Furth, Fed. Rep. of Germany

[21] Appl. No.: 677,838

[22] Filed: Dec. 4, 1984

[51] Int. Cl.$^4$ ............................................. B23B 51/04
[52] U.S. Cl. ..................................... 408/206; 125/20; 408/25; 408/36; 408/118; 408/186
[58] Field of Search ....................... 408/10, 11, 12, 13, 408/33, 36, 42, 46, 48, 53, 117, 118, 119, 120, 121, 122, 123, 129, 130, 132, 134, 137, 191, 193, 198, 203, 203.5, 204, 24, 25, 186; 409/185, 187, 192, 203, 217, 218; 51/81 R, 283 R; 125/20

[56] References Cited

U.S. PATENT DOCUMENTS

| | | | |
|---|---|---|---|
| 2,590,068 | 3/1952 | Perrul | 408/24 |
| 3,635,573 | 1/1972 | Halpern | 408/186 |
| 3,778,179 | 12/1973 | Rivas | 408/118 X |
| 4,066,380 | 1/1978 | Beck et al. | 408/36 X |
| 4,297,059 | 10/1981 | Miyanaga | 125/20 X |
| 4,436,460 | 3/1984 | Powell | 408/13 X |
| 4,449,868 | 5/1984 | Steinsberger et al. | 408/129 X |
| 4,514,121 | 4/1985 | Fuchs, Jr. | 408/42 X |

FOREIGN PATENT DOCUMENTS 2658344 6/1978 Fed. Rep. of Germany ...... 408/117

Primary Examiner—Gil Weidenfeld
Assistant Examiner—Glenn L. Webb
Attorney, Agent, or Firm—Karl F. Ross; Herbert Dubno

[57] ABSTRACT

Drill apparatus, especially for drilling glass, with hydraulic and/or mechanically advancing, driven drill spindle, wherein the drill spindle is secured in a spindle carrier and is equipped at the end which is facing towards the workpiece with a drill, as well as being equipped with a countersink or the like drill which generally surrounds the drill, whereby the drill and the countersink drill are axially adjustable with respect to one another, in accordance with the preceding wear. The drill is connected in a drill carrier by way of adjustment threads. An automatic adjustment device is provided for the drill in the drill spindle, which adjustment device includes a mechanical, forward and reverse step motion device with a screw-type guide, and a hydraulic cylinder/piston actuating assembly for the step motion device. The hydraulic cylinder/piston actuating assembly can be supplied with hydraulic pressure medium through the drill spindle carrier and additional passages. An adjustment torque is imparted via the step motion device to the drill, whereby the drill is adjusted in its position in the adjustment threads.

8 Claims, 5 Drawing Figures

DRILLING MACHINE ESPECIALLY FOR DRILLING GLASS

FIELD OF THE INVENTION

Our present invention relates to drills or to a drilling apparatus. More particularly, the invention is concerned with an apparatus for drilling glass or similar materials. Still more particularly, the invention is concerned with drills or a drilling apparatus which can be equipped with hydraulic and/or mechanically advancing motor-driven drill spindles.

BACKGROUND OF THE INVENTION

The drill spindle of a drilling machine for glass is usually journaled for rotation in a carrier, or similar receiving member, and it is equipped with a main drill at the end directed towards the workpiece, as well as being equipped with a chamfering drill, countersink, counterbore, or like second drill means, which generally surrounds the first or primary drill. The drill and the chamfering drill must be axially adjustable with respect to one another, in accordance with the wear of the main drill, which is accelerated with respect to the countersink so as to compensate for such wear.

The drill is then connected in a drill carrier or receiver by way of adjustment threads. The drill is preferably a core drill. Advancing of the drill spindle is done with or relative to the drill spindle carrier.

It wil be understood, moreover, that drilling machines for drilling glass are usually operated with drill spindle pairs, wherein each individual assembly is identical to the other in the pair up to the coolant feeding means.

The main drill and the chamfering drill of each unit are fed toward the coring drill and countersink of the other unit from above and below the glass pane and meet to form the bore.

The prior art drill apparatus for this purpose have manual means for effecting adjustment of the relative positions of the main drill and the countersink or chamfering drill. This is labor intensive and must be done with great care by highly specialized personnel. Moreover, the adjustment must be made in very small increments of the order of a millimeter.

OBJECTS OF THE INVENTION

It is an object of the invention to provide an improved drill apparatus of the type described whereby the adjustment can be carried out substantially automatically.

Another object is to provide an improved glass drilling machine which permits of precise adjustment of the drill bit for wear.

SUMMARY OF THE INVENTION

In accordance with the present invention, these objects are attained by providing an adjustment device in the drill spindle which substantially automatically adjusts the drill bit.

The adjustment device includes a mechanical, forward and reverse stepping mechanism with a guide slot or similar helical guide. A hydraulic piston/cylinder actuating assembly is provided for this step motion device or mechanism and a hydraulic pressure medium can be passed to the hydraulic piston/cylinder actuating assembly through passages in the drill spindle carrier and at least one circular or similar rotationally effective passage.

Adjustment torque is imparted to the drill by means of the step motion device, whereby the drill is adjusted as to its position via the adjustment threads.

The invention is based on the recognition that a mechanical step-motion device and a hydraulic piston/cylinder actuating assembly can be arranged without major problems in the drill spindle or the drill apparatus briefly described in the foregoing, and that the hydraulic piston/cylinder assembly can be supplied with its pressure medium via a circular passage without difficulty. Such an arrangement allows the automatic adjustment of the drill in desired small adjustment steps, as a consequence of the advanced wear of a drill, with respect to the chamfering or sinker drill countersink and having regard to the configuration of the step motion device and the pitch of the adjustment threads.

Within the scope of the invention, various configurations of the step motion device and the hydraulic actuating assembly can be used.

In a preferred embodiment, the drill apparatus has a step motion device which is provided with a control sleeve which is guided in the drill spindle. The control sleeve is guided in and by a screw-type guide and at its end face directed towards the drill has an effective number of sawteeth or similar unidirectionally effecting coupling means allowing a locking engagement of respective components.

A coupling is connected to the control sleeve on the drill side by way of corresponding teeth, and the coupling, in turn, is operatively connected to a plunger, whereby the coupling engages with the plunger by means of a multi-sided member, for example, a four-sided member. This member, in turn, transfers the adjustment torque to the drill by means of noncircular plunger sides or formations.

A reset spring can be provided between the coupling and the plunger. This reset spring between the coupling or intermediate part can be arranged in a hollow plunger.

In accordance with a preferred embodiment, the hydraulic actuating piston/cylinder assembly includes a piston which is actuated by the pressure medium in opposition to a piston reset spring. The piston is guided, by way of a guide pin, in respective axial slots or similar passages of the drill spindle, and the piston acts on or actuates the control sleeve.

In the most simple embodiment, the control sleeve is furnished with screw-pitch slots, screw-flight slots, or similar slots which are adapted to perform the function of the screw-type or helical guide, the slots being traversed by the guide pin of the actuating piston.

BRIEF DESCRIPTION OF THE DRAWING

The above and other objects, features and advantages of the invention will become apparent from the following description, reference being made to the accompanying drawing, in which.

SPECIFIC DESCRIPTION

Figure 1:
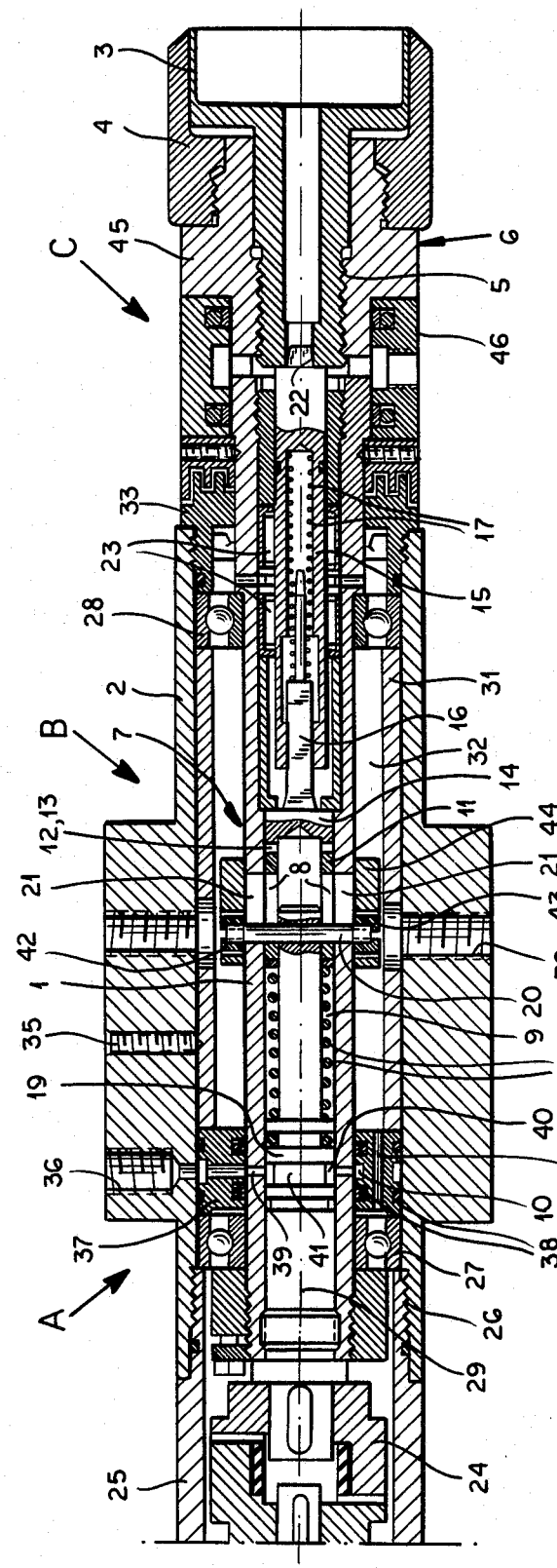
FIG. 1 is an axial cross section of the drill spindle of one embodiment of a drill apparatus with a drill spindle carrier.

The drill spindle 1 shown in the drawing forms with its drill spindle carrier 2, part of a glass drill or borer machine, not further shown. The drill spindle 1 can be moved or advanced with the carrier 2, either hydraulically or mechanically. The elements for so actuating the respective components are not shown in detail since they are well known in the art. The spindle 1 is furthermore driven and rotated, for example, by a motor, not shown, which would be connected at the left in FIG. 1.

The drill spindle 1 carries at that end which is directed towards the workpiece, i.e., at the right end in FIG. 1, a drill or coring bit 3 which is concentrically surrounded by a sinker, or countersink, chamfering or second drill 4. The main drill 3 and the countersink drill 4 are axially adjustable with respect to one another to compensate for the more accelerated wear of the drill 3. Furthermore, the drill 3 is screwed by its external threads into a drill carrier or receiver 6 whose internal threads 5 which provide for the adjustment as desired.

An automatic adjustment device is provided for the drill 3 in the hollow drill spindle 1. In its basic configuration, the adjustment device includes a mechanical, forward and reverse stepping mechanism, or step-motion device 7 which is furnished with a guide screw or similar screw-type guide 8, and a hydraulic cylinder/piston actuating assembly or arrangement 9 for the step motion device 7. The hydraulic cylinder/piston actuating assembly 9 is supplied with a hydraulic pressure medium through passages in the drill spindle carrier 2 and a circular or similar rotational passage 10.

The step motion device 7 is adapted to impart an adjustment torque to the drill 3, whereby the drill 3 is adjusted as to its axial position by the adjustment threads 5.

The step-motion device 7 is provided with a control sleeve 11 which is helically guided in the drill spindle 1, particularly, it is provided with screw type or helical guide slots 8.

At its end face directed towards the drill 3, the control sleeve 11 has sawteeth 12. An intermediate part or coupling 14 is connected to the control sleeve 11 on the drill side by way of complementary sawteeth 13. This coupling 14, in turn, is operatively connectible to a plunger 15. The coupling 14 engages with the plunger 15 by means of a multi-sided member 16, which can be a four-sided member, and the plunger 15 transfers the adjustment torque to the drill 3. A reset spring 17 is provided beween the coupling 14 and the plunger 15 and it specifically provided in the plunger 15. The aforementioned slots 8 of the control sleeve 11 produce the adjustment torque under the influence of the hydraulic piston/cylinder actuating assembly, or actuator 9.

Figure 3:
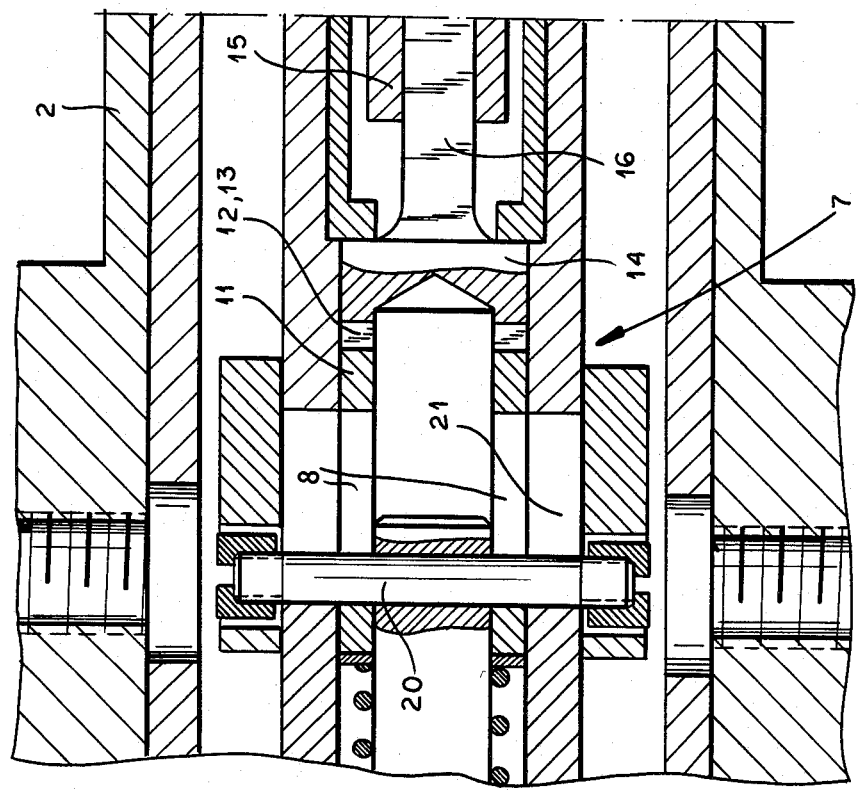
FIG. 3 is a detail of the region B in FIG. 1, drawn in the scale of FIG. 2.
Figure 2:
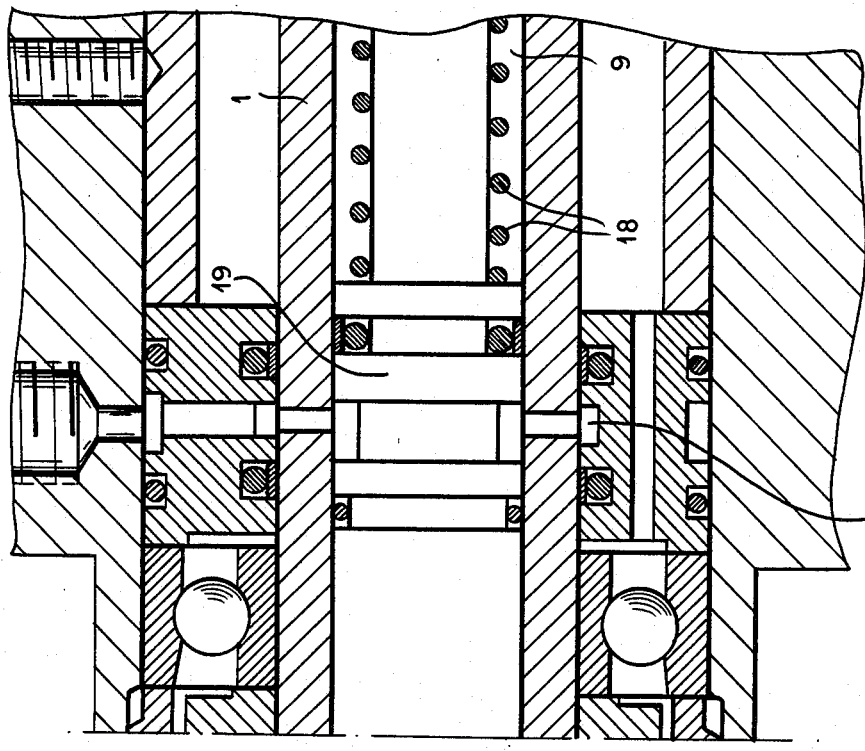
FIG. 2 is a detail of the region designated by arrow A in FIG. 1, drawn to a larger scale.
Figure 4:
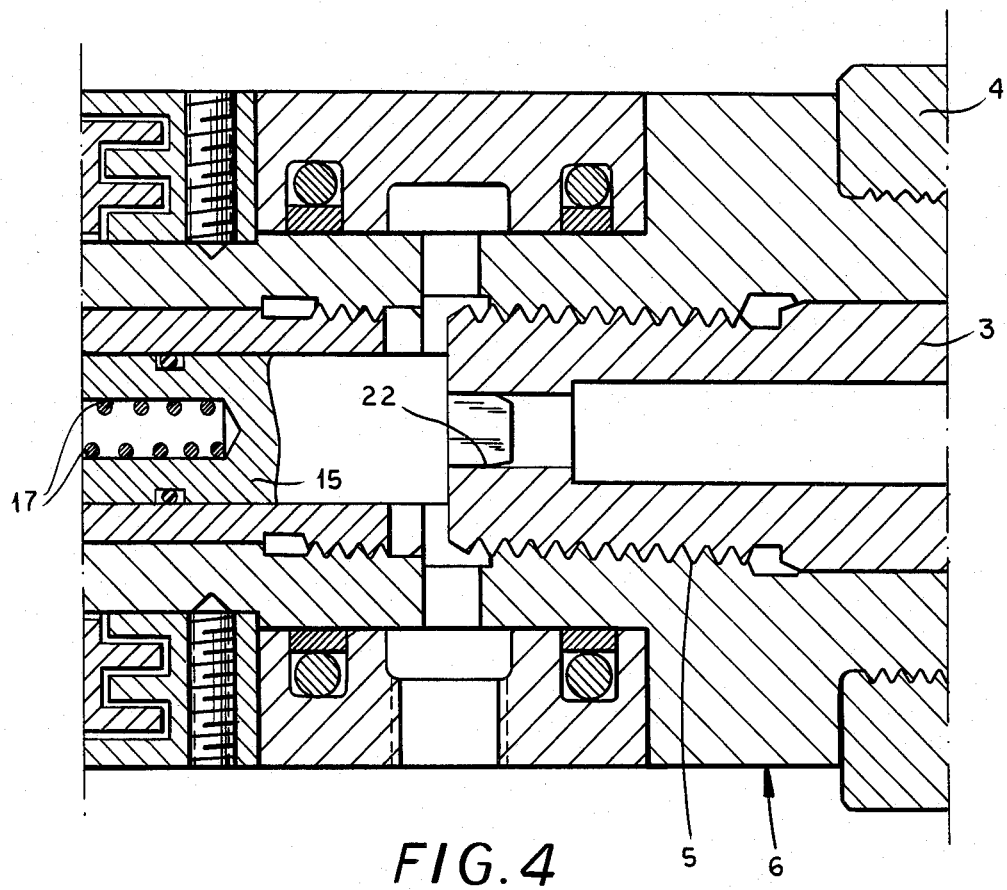
FIG. 4 is a detail of the region C in FIG. 1, also drawn in the scale of FIG. 2.

It is particularly evident from FIGS. 2 and 3 that the hydraulic piston/cylinder actuating or actuator assembly 9 includes an actuating piston 19 which is actuated by the pressure medium in opposition to a piston reset spring 18. The piston 19 is guided by means of a guide pin 20 in axial slots or similar passages 21 of the drill spindle 1, and the piston 19 acts on the control sleeve 11. As has been indicated, the control sleeve 11 has helical guide slots 8, through which the guide pin 20 extends.

Upon actuation of a solenoid-actuated valve, not shown, arranged outside of the drill carrier 2, oil is introduced under pressure into the drill spindle 1. The actuating piston 19 is moved by the pressure medium, and moves in the direction of the drill 3. The guide pin 20, which is firmly connected to the actuating piston 19, is guided in the aforementioned axial slots 21 of the spindle with respect to which the piston 19 and the pin 20 do not rotate.

The control sleeve 11 is then rotated because its guide slots 8 are engaged by the same pin 20. The assembly is selected in such a way that at least one of the teeth 12 at the frontal side or face of the control sleeve 11 moves, or takes along as it were, the coupling 14 through engagement with the companion teeth 13.

The plunger 15 is rotated by way of the aforementioned multi-sided member 16, and the plunger 15 imparts the rotating or rotary movement to the drill 3, particularly by way of the plunger surfaces 22 which angularly entrain the drill. By means of the adjustment threads 5 provided at the drill and in the hollow drill spindle 1, the rotation ensures that an axial adjustment is achieved in conformity with the control step.

The application may be selected in such a way that each adjustment step of the drill 3 with respect to the sinker drill 4 is of a preferred order of magnitude of 1/10 mm, or less, or more, respectively. A further adjustment step can only be carried out when the pressure of the pressure medium is removed from the actuating piston 19. The actuating piston 19 is returned by the piston reset spring 18. Simultaneously, the control sleeve 11 is returned through an arc or angle which is equal to that experienced in forwardly moving, or rotating motion, during the forward stroke of the actuating piston 19. The teeth 12 then jump back by one tooth. It will be understood that the coupling 14 and the plunger 15 are prevented from rotating in the reverse direction by the return motion suppressors 23 indicated in FIG. 1. These may simply be high friction elements. A further adjustment is done by repeating admission of pressure to the actuating piston 19.

More specifically, the spindle 1 is connected by a flexible coupling 24 to the electric drive motor, not shown, mounted in a housing 25 connected by a screw thread 26 to the spindle carrier 2. The latter is provided with a pair of bearings 27, 28 rotatably journaling the spindle 1 for rotation about its axis 29 which corresponds to the axis of the coring drill 3, the latter having been shown only diagrammatically.

The lubricant bore 30 is provided in the carrier 2 and communicates through a spacing sleeve 31 with the chamber 32 communicating with the bearings and appropriate seals 33 can be provided as represented only at one end, to block escape of the lubricant.

A passage 34 permits lubricant to reach the bearing 27.

The sleeve 31 is held in place by a setscrew 35.

The radial bore 36 formed in the spindle carrier 2 communicates with the annular passage 10 formed in a bushing 37 sealed by O-rings 38 against the spindle and the carrier 2, the spindle 1 being provided with radial bores 39 which communicate with the annular passage 10 to permit the hydraulic fluid to flow into a compartment 40 on the left-hand side of the piston 19 which is shown to be held by the spring 18 against the stop 41.

The pin 20 is threaded at its end and is held in place in the slots 8 and 21 by threaded sleeves 42 and 43 engaged in bores of a guide sleeve 44.

Thus when the piston 19 is displaced to the right, it entrains the pin 20 and the sleeve 44 in this direction, the sleeve 44 and the threaded members 42, 43 preventing the pin 20 from moving laterally out of the piston.

Figure 5:
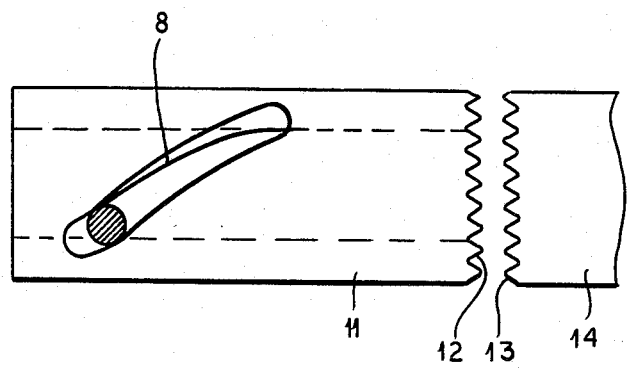
FIG. 5 is a diagram in elevation showing a part of the stepping mechanism.

FIG. 5 shows one of the slots 8 in the control sleeve 11 which is formed with the sawtooth array 12 engagable with the sawteeth 13 of coupling 14. As previously noted, the plunger surfaces 22 are angularly coupled to the drill 3 so that the upon rotation of the coupling 14, the plunger 15 will rotate and will rotatably entrain the drill. Since the drill threads are received in the bushing 45 which is formed on the carrier 6 and the carrier 6 is integral with the spindle 1, this rotation can advance the drill 3 relative to the chamfering drill 4 which is also mounted on this bushing. A sleeve 46 can be connected to the spindle so that it can be gripped to allow manual rotation of the drills and hence replacement or manual adjustment as may be required.

We claim:

1. A drill apparatus, especially for drilling glass, said apparatus comprising:
   a drill spindle carrier;
   a rotatably driven drill spindle operatively connected to said carrier so as to be advanced toward a workpiece;
   a first drill connected to said drill spindle at a working end thereof;
   a sinker drill operatively connected to said first spindle and surrounding said first drill, said first drill and said sinker drill being axially adjustable with respect to one another to compensate for accelerated wear of said first drill relative to said sinker drill;
   a drill receiver on said spindle and connected to said first drill by means of adjustment threads; and
   an adjustment device for said first drill, said adjustment device including:
   a mechanical, forward and reverse stepping mechanism;
   a hydraulic cylinder/piston actuating assembly for actuating said mechanism; and
   means for supplying to said hydraulic cylinder/piston actuating assembly a hydraulic pressure medium and including at least one passage in said drill spindle carrier and at least one circular passage in said drill spindle, said mechanism being constructed and arranged to impart an effective amount of adjustment torque to said first drill such that said first drill is axially advanced by said adjustment threads, said mechanism including a control sleeve rotatably and axially guided in said drill spindle along a helical path, said control sleeve at its end face directed towards said drill having a plurality of sawteeth, a coupling having a corresponding plurality of teeth cooperating with the teeth of said control sleeve, a plunger having a multi-sided member for operatively connecting it therewith to said coupling for transfer of adjustment torque to said first drill, and a reset spring between said coupling and said plunger.

2. The drill apparatus defined in claim 1 wherein said reset spring is arranged between said coupling and said plunger within said plunger.

3. The drill apparatus defined in claim 1 wherein said actuating assembly includes a piston and piston reset spring operatively connectible thereto, wherein said piston can be actuated by a pressure medium in opposition to said piston reset spring, and wherein said piston displaces a guide pin guided in axial slots formed in said drill spindle, and said piston is adapted to operatively move said control sleeve.

4. The drill apparatus defined in claim 3 wherein said control sleeve comprises helical slots, and said guide pin of said piston extends at least in part through said helical slots.

5. In a drill apparatus, especially for drilling glass, with hydraulic and/or mechanically advancing, driven drill spindle, or boring or drilling machines, wherein the drill spindle is secured in a drill spindle carrier, and is equipped at an end directed towards the workpiece with a first drill, as well as being equipped with a countersink drill which surrounds the first drill, whereby the first drill and countersink drill are axially adjustable with respect to one another in accordance with the accelerated wear of the first drill so as to compensate for the wear of at least one of the drills, the improvement wherein:
   automatic adjustment device is provided for the first drill (3) in the drill spindle (1), which adjustment device includes a mechanical forward and reverse stepping device (7) with guide helix (8), and a hydraulic cylinder/piston actuating assembly (9) for this stepping device (7), and to the hydraulic cylinder/piston actuating assembly (9) a hydraulic pressure medium is supplied through passages in the drill spindle carrier (2) and a circular passage (10), and by means of the stepping device (7) an adjustment torque is imparted to the drill (3), whereby the first drill (3) is adjusted in its position by adjustment threads (5) between the first drill and the spindle, the stepping device (7) being provided with a control sleeve (11) which is guided in the drill spindle (1), which is guided by the helix (8) said sleeve having an end face directed towards the drill (3) and provided with sawteeth (12), a coupling (14) being connectable to the control sleeve (11) by way of corresponding sawteeth, the coupling (14) being connected to a plunger (15) by means of a multi-sided member (16) which transfers the adjustment torque to the drill (3), and a reset spring (17) provided between the coupling (14) and the plunger (15).

6. The improvement defined in claim 5 wherein the reset spring (17) is arranged between the coupling (14) and the plunger (15) in the plunger (15).

7. The improvement defined in claim 5 wherein the actuating assembly includes a piston (19) which is actuated by the pressure medium in opposition to a piston reset spring (18), which piston (19) is guided by way of a guide pin (20) in axial slots (21) of the drill spindle (1), and the piston (19) acts on the control sleeve (11).

8. The improvement defined in claim 9 wherein the control sleeve (11) has, as its guide helix stops (18) through which the guide pin (20) of the actuating piston (19) extends

* * * * *